United States Patent [19]

Peck et al.

[11] Patent Number: 5,716,097
[45] Date of Patent: Feb. 10, 1998

[54] RETRACTOR PLATE FOR INTEGRAL CHILD RESTRAINT SEAT

[75] Inventors: Steven E. Peck, Waterford; Ed Dykema, Brighton; Donald Lux, Sterling Heights; Michael Price, Waterford, all of Mich.

[73] Assignee: Lear Corporation, Southfield, Mich.

[21] Appl. No.: 642,980

[22] Filed: May 10, 1996

[51] Int. Cl.[6] .................... A47C 15/00; A47C 1/11; A47D 1/10
[52] U.S. Cl. .................... 297/238; 297/378.12; 297/475; 297/486
[58] Field of Search .................... 297/238, 475, 297/378.12, 486

[56] References Cited

U.S. PATENT DOCUMENTS

| | | | |
|---|---|---|---|
| 4,342,483 | 8/1982 | Takada | 297/250.1 X |
| 5,061,012 | 10/1991 | Parker et al. | 297/250.1 X |
| 5,280,995 | 1/1994 | Elton | 297/238 |
| 5,282,667 | 2/1994 | Elton et al. | 297/238 |
| 5,364,169 | 11/1994 | Collins et al. | 297/238 X |
| 5,380,060 | 1/1995 | Sponsler et al. | 297/378.12 X |
| 5,383,707 | 1/1995 | Osenkowski et al. | 297/378.12 X |
| 5,385,384 | 1/1995 | Gierman et al. | 297/238 |
| 5,398,997 | 3/1995 | McFalls | 297/476 X |
| 5,449,223 | 9/1995 | Miculuci et al. | 297/238 X |
| 5,472,260 | 12/1995 | Czapski et al. | 297/238 X |
| 5,474,357 | 12/1995 | Dukatz et al. | 297/238 |
| 5,498,062 | 3/1996 | Holdampf | 297/238 |
| 5,611,603 | 3/1997 | Gray et al. | 297/238 X |

OTHER PUBLICATIONS

PCT Application, Publication No. WO 95/17322, Application No. PCT/US94/14525, Entitled: "Five-Point Safety System for a Seat".

Primary Examiner—Peter M. Cuomo
Assistant Examiner—Rodney B. White
Attorney, Agent, or Firm—Howard & Howard

[57] ABSTRACT

A child restraint assembly is integrated into the backrest portion of a passenger seat in motor vehicle. The assembly includes a rear cushion and a pivoting bottom cushion for supporting a child in a seated posture. Left and right safety belts extend in a generally vertical direction over the torso of the child to secure the child on the rear and bottom cushions. The left and right safety belts are wound on individual retractor spools each having a respective vertical axis of rotation which allows the left and right safety belts to emanate in opposing horizontal directions. A diverter plate is positioned near the retractor spools for redirecting each of the left and right safety belts from the generally horizontal direction upon which each emanates from its respective retractor spool to the generally vertical use direction, thus providing more efficient and beneficial packaging options. Also, it is possible to better maintain tension in the safety belts thereby resisting improper rewinding upon the retractor spools. Additionally, the retraction forces present on the safety belts by way of the power or other return spring mechanism associated with the retractor spools reduces the chances for discomfort to the restrained child.

16 Claims, 2 Drawing Sheets

5,716,097

RETRACTOR PLATE FOR INTEGRAL CHILD RESTRAINT SEAT

TECHNICAL FIELD

The subject invention relates generally to child restraint assemblies which are integrated into the backrest portion of a passenger seat in motor vehicle, and more particularly to an improved safety belt retraction arrangement therefor.

BACKGROUND OF THE INVENTION

Passenger seat assemblies in motor vehicles often incorporate an integral child safety seat into the backrest portion. These integral child seats are a great convenience over the bulky prior art strap-in-place child seats, and allow the vehicle seat to be quickly converted between child and adult use.

Integral child seats typically include a rear cushion recessed in the backrest portion of the main seat assembly. A bottom cushion of the child seat pivots between a stored position and a deployed position. In the stored position, the bottom cushion is folded flat against the rear cushion, forming a flush surface in cooperation with the backrest portion of the seat. In the deployed position, the bottom cushion extends generally perpendicularly from the backrest to support the buttocks and legs of the child. Examples of prior art vehicular seat assemblies including an integral child seat may be found in U.S. Pat. Nos. 5,280,995 to Elton, issued Jan. 25, 1994 and 5,398,997 to McFalls, issued Mar. 21, 1995, as well as PCT International Publication No. WO 95/17322 to AlliedSignal Inc., published Jun. 29, 1995.

Child restraint seats typically include integrated left and right safety belts which each extend in a generally vertical direction over the torso of a child to secure the child on the rear and bottom cushions. Some type of retractor means is associated with the safety belts for adjusting the effective length of the left and right safety belts to facilitate placing the child in and removing the child from the restraint seat. The automated types of retractor means normally include a retractor spool for each of the left and right safety belts. The retractor spools are each rotatably supported about respective axes of rotation that are coincidental to one another and supported horizontally. This often results in limiting the design options for placement of the retractor means, and furthermore may cause discomfort to the child over extended periods of time if the retractor means exerts too great a pulling force on the safety belts. Also, if the safety belts are left to retract rapidly onto the spools, slack may build-up in the belts and result in tangling or improper rewinding upon the spool.

SUMMARY OF THE INVENTION AND ADVANTAGES

The subject invention relates to a child restraint assembly which is integrated into the backrest portion of a passenger seat in motor vehicle. The assembly comprises a rear cushion for supporting the torso of the child in a seated posture, and a bottom cushion pivotally moveable relative to the rear cushion between a stowed position and a deployed position for supporting the buttocks and legs of a child in a seated posture. Left and right safety belts each extend in a generally vertical direction over the torso of the child to secure the child on the rear and bottom cushions. A retractor means is provided for adjusting the effective length of the left and right safety belts. The retractor means includes a first retractor spool rotatably supported about a first axis of rotation. The improvement of the subject invention resides in a mounting plate for rotatably supporting the first retractor spool with its first axis of rotation oriented vertically so that the left and right safety belts emanate in a generally horizontal direction.

Forcing the left and right safety belts to emanate in a generally horizontal direction allows a more efficient and beneficial packaging of the retractor means than heretofore available with any prior art options. For example, with the subject invention it is possible to orient the retractor means behind the rear cushion of the child seat, whereas this was not practical with prior art assemblies. This, in turn, increases design opportunities for the vehicular seat assembly as a whole. Also, by playing out the left and right safety belts in a generally horizontal direction, and then redirecting the belts to the vertical orientation externally to overlie the child's torso, significant assistance is provided in maintaining tension in the safety belts, thereby resisting the build-up of slack in the belts which might otherwise result in tangling or improper rewinding upon the spool. More importantly, however, this will help to soften the retraction forces present on the safety belts by way of the power or other return spring mechanism associated with the retractor spools without causing irritation to the child. Therefore, rather powerful return springs can be used without inflicting discomfort on the restrained child. Accordingly, it will be possible to utilize the same retractor means as is used in connection with the adult safety belt system, thereby reducing manufacturing costs and inventory requirements.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
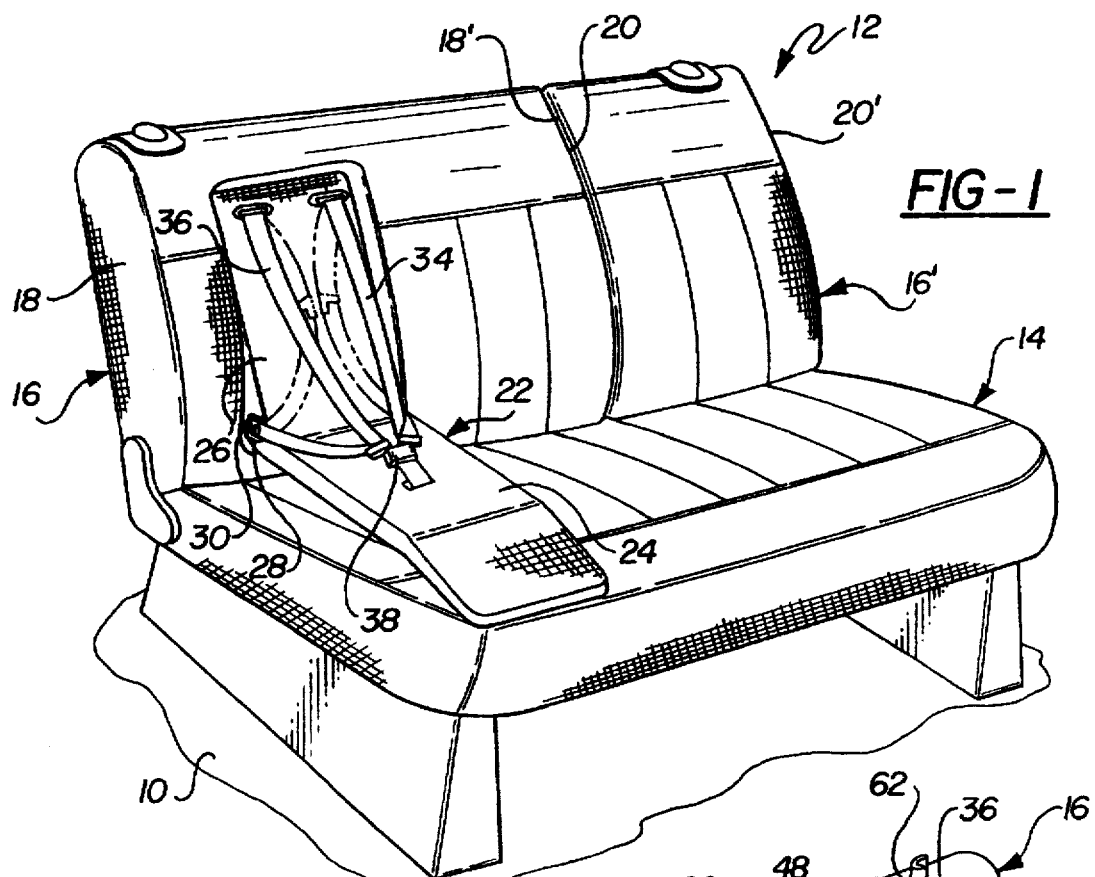
FIG. 1 is a simplified perspective view of a motor vehicle seat assembly according to the subject invention showing a bottom cushion of an integral child restraint seat opened to a deployed position.
Figure 2:
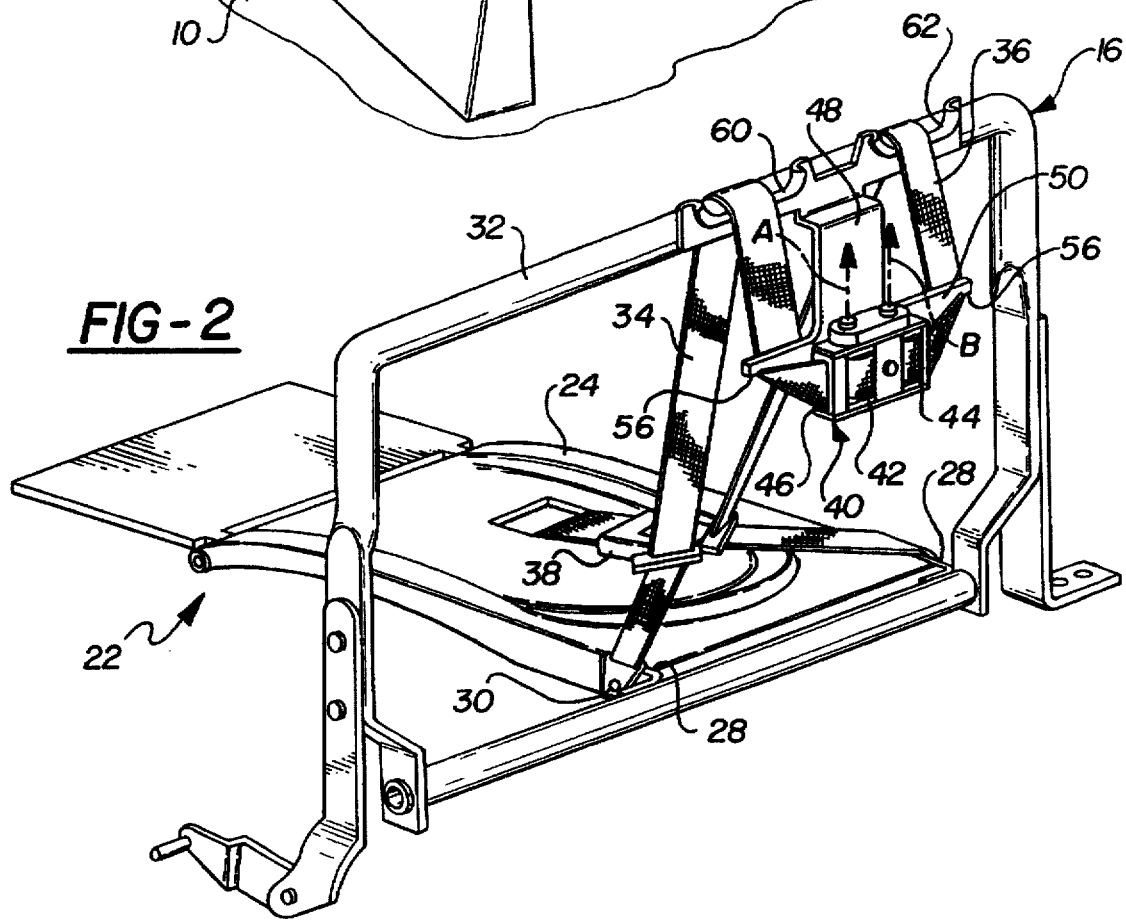
FIG. 2 is a simplified rear perspective view of the internal frame structure of the backrest portion of the seat assembly including a five-point safety harness.

Referring to the Figures, wherein like numerals indicate like or corresponding parts throughout the several views, the subject invention pertains to a typical motor vehicle having a passenger compartment, the floor of which is indicated at 10 in FIGS. 1 and 2. Secured to the floor 10 in the passenger compartment of the motor vehicle is a folding passenger seat assembly, generally shown at 12. The seat assembly 12 includes a seat portion, generally indicated at 14, and a backrest portion, generally indicated at 16. The backrest portion 16 has a left end 18 and a right end 20. As shown in FIG. 1, the backrest portion 16 may be of the so-called 60/40 split type including a companion backrest portion 16' of unequal length which can be independently manipulated.

Alternatively, the backrest portion 16 may be of the traditional full length one piece type (not shown) which is coextensive with the seat portion 14.

In the case of the 60/40 split type, those skilled in the art will appreciate that both the backrest portion 16 and its companion backrest portion 16' will have a left end 18, 18' and a right end 20, 20', respectively, and that the subject invention may be practiced on either one or both of the backrest portions 16, 16'. However, the specific components of the seat assembly 12 which are described below with reference to the left end 18 or the right end 20 will generally be reversed in connection with the companion backrest portion 16'. This is because the outboard end of the backrest portion 16 is the left end 18, whereas the outboard end of the companion backrest portion 16' is the right end 20', as viewed from FIG. 1. Similarly, the inboard end of the backrest portion 16 is the right end 20, whereas the inboard end of the companion backrest portion 16' is the left end 18'. The backrest portion 16 shown in FIG. 1 preferably includes an integral fold-down child safety seat, generally indicated at 22.

The seat assembly 12 includes a hinge means, not shown, for arcuately moving the backrest portion 16 relative to the seat portion 14 between a generally vertical use position and a generally horizontal folded position. The hinge means may take any of various forms known to those skilled in the art, such as that shown in the applicant's copending U.S. patent application Ser. No. 08/632,933, filed Apr. 16, 1996 the disclosure of which is hereby incorporated by reference.

The child seat 22 is integrally recessed within the backrest portion 16 for securing a child therein. The child seat 22 includes a bottom cushion 24 pivotally moveable between a stowed position and a deployed position (FIG. 1), and a rear cushion 26 adjacent the bottom cushion 24. The bottom cushion 24 is pivotally supported on each of its sides by a cantilevered support bar 28 extending from the backrest portion 16. The bottom cushion 24 is hingedly supported on the support bars 28 by way of pins 30. As shown in FIG. 2, the backrest portion 16 of the seat assembly 12 includes a skeletal internal frame structure 32 composed of rigid metal tubes shaped and welded so as to provide necessary support to the fabric and foam materials. The cantilever support bars 28 extend directly from the internal frame structure 32.

The child seat 22 is provided with a five-point safety harness, although those skilled in the art will readily appreciate other safety harness configurations than the specific five-point configuration described below and illustrated in the drawing figures. The safety harness includes a left safety belt 34 and a right safety belt 36. Each of the left and right safety belts 34, 36 extend externally of the rear cushion in a generally vertical use direction over the torso of a child (not shown) when in actual use. The lowermost ends of each left and right safety belt 34, 36 are attached to the respective support bars 28, preferably on the pins 30. A crotch buckle 38 and accompanying strap extend upwardly from the bottom cushion 24 for coupling with each of the left and right safety belts 34, 36.

Figure 3:
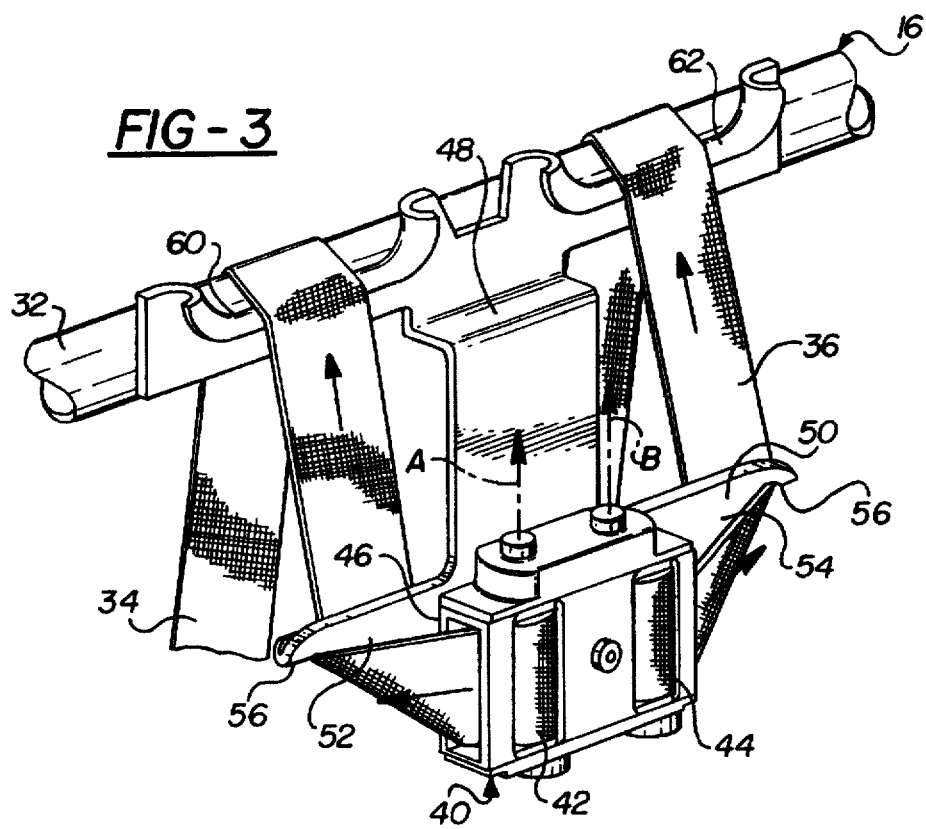
FIG. 3 is a fragmentary rear perspective view showing the retractor means, the mounting plate and the diverter plate of the subject invention.

A retractor means, generally indicated at 40 in FIGS. 2 and 3, is operatively associated with the left and right safety belts 34, 36 for adjusting their effective length as a child is positioned on and removed from the child seat 22. The retractor means 40 is preferably of the automatic type including a first retractor spool 42 rotatably supported about a first axis of rotation A. The retractor means 40 includes a second retractor spool 44 rotatably supported about a second axis of rotation B which is adjacent and parallel to the first axis A. The first 42 and second 44 retractor spools are together rotatably supported on a mounting plate 46 such that their respective axes A, B of rotation are both oriented vertically and so that the left and right safety belts 34, 36 emanate in a generally horizontal direction. This configuration allows a more efficient and beneficial packaging of the retractor means 40 than heretofore available with any prior art options.

Each retractor spool 42, 44 is of the type well known in the art having associated power springs to effect automatic retraction of the respective safety belt 34, 36, and appropriate lock-up mechanisms to prevent lengthening of the effective lengths of the safety belts 34, 36 in the event of sudden vehicular deceleration. A protective box-like cover (not shown) may be attached to the mounting plate 46 to enshroud the retractor spools 42, 44. Referring to FIGS. 2 and 3, the left and right safety belts 34, 36 are shown playing from the rearward most side of the respective retractor spools 42, 44, in opposing horizontal directions.

Figure 4:
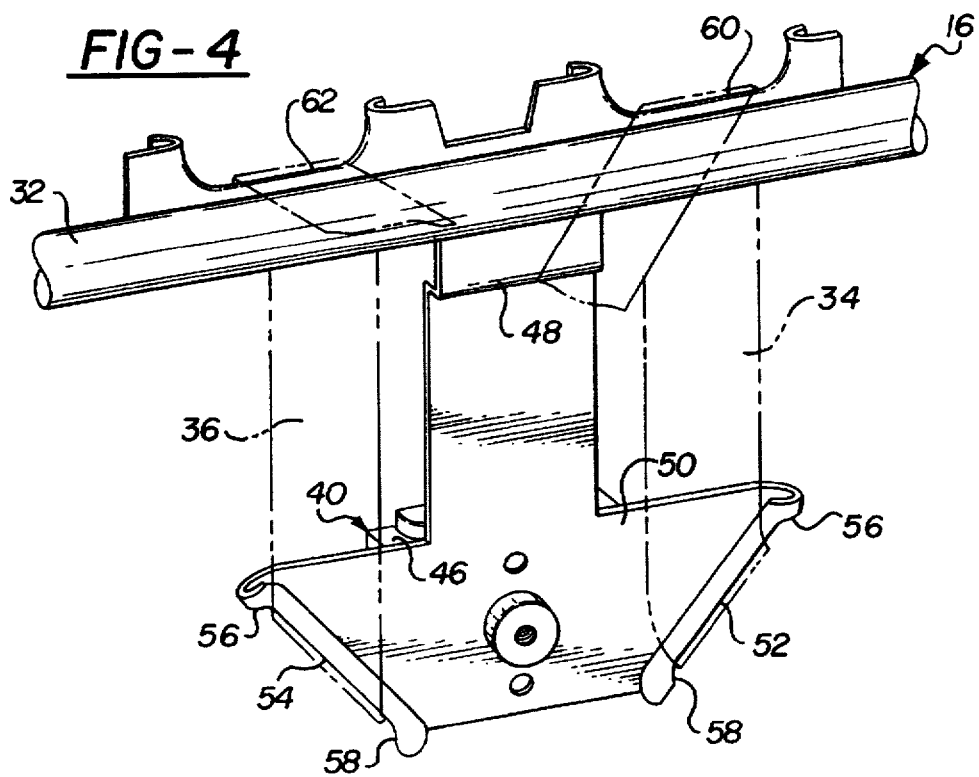
FIG. 4 is a fragmentary front perspective view showing the mounting plate and the diverter plate of the subject invention.

As shown in FIGS. 2–4, the mounting plate 46 is integrally connected to the internal frame structure 32 of the backrest portion 16 by a frame bracket 48. The frame bracket 48 may simply be an L-shaped member formed from structurally satisfactory sheet metal. The frame bracket 48 is welded to the top tubular frame component of the internal frame structure 32, and extends rearwardly therefrom with the mounting plate 46 in a depending condition.

A diverter plate 50 extends integrally from the mounting plate 46 and is provided for redirecting each of the left and right safety belts 34, 36 from the generally horizontal direction upon which each emanates from its respective retractor spool 42, 44 to the generally vertical use direction. The diverter plate 50 includes a left routing bar 52 operatively associated with the left safety belt 34 and a right routing bar 54 operatively associated with the right safety belt 36. The left and right routing bars 52, 54 comprise respective formed and rolled-over portions of the diverter plate 50, and serve to bend or alter the course of each safety belt 34, 36 so that it ultimately travels in a vertical direction over the torso of a child positioned in the child seat 22.

The left and right routing bars 52, 54 are preferably angled 45° to convert the horizontal movement of the left and right safety belts 34, 36 emanating horizontally from the respective retractor spools 42, 44, to the vertical direction required externally of the rear cushion 26. Those skilled in the art will readily appreciate, however, that the specific angle of the routing bars 52, 54 will be determined by the included angle between the safety belts 34, 36 as they are unwound (and rewound) from the respective retractor spool 42, 44 and as they extend externally of the rear cushion 26. Each of the left and right routing bars 52, 54 include an upper anti-slip hook 56 and a lower anti-slip hook 58. The anti-slip hooks 56, 58 prevent the respective safety belts from sliding off the diverter plate 50.

The internal frame structure 32 includes a left pass-over bar 60 operatively associated with the left safety belt 34 and a right pass-over bar 62 operatively associated with the right safety belt 36. The pass-over bars 60, 62, like the routing bars 52, 54, comprise respective formed and rolled-over portions of sheet metal, and serve to bend or alter the course of each safety belt 34, 36 so that it ultimately travels in a vertical direction over the torso of a child positioned in the child seat 22. The pass-over bars 60, 62 also protect the rear cushion fabric and any associated eyelets in the areas where the respective right and left safety belts 32, 34 pass through by positionally restraining the safety belts 32, 34.

The pass-over bars 60, 62 and the routing bars 52, 54 further help to soften the retraction forces present on the safety belts 32, 34 by way of the power or other return spring mechanism associated with the retractor spools 42, 44. Therefore, rather powerful return springs can be used without inflicting discomfort on the restrained child. Preferably, the same retractor means as is used in connection with the adult safety belt system can be utilized, thereby reducing manufacturing costs and inventory requirements. By the same means, the pass-over bars 60, 62 and the routing bars 52, 54 also help maintain tension in the safety belts, thereby resisting the build-up of slack in the belts 32, 34 which might otherwise result in tangling or improper rewinding upon the spools 42, 44.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

What is claimed is:

1. A child restraint assembly integral with a passenger seat in motor vehicle, said assembly comprising: a rear cushion for supporting the torso of a child in a seated posture; a bottom cushion pivotally moveable relative to said rear cushion between a stowed position and a deployed position for supporting the buttocks and legs of a child in a seated posture; left and right safety belts each extending an effective length in a generally vertical use direction over the torso of a child to secure the child on said rear and bottom cushions; retractor means for adjusting the effective length of said left and right safety belts, said retractor means including a first retractor spool rotatably supported about a first axis of rotation and a second retractor spool rotatably supported about a second axis of rotation adjacent and parallel to said first axis; a mounting plate for rotatably supporting said first and second retractor spools with said respective first and second axes of rotation oriented vertically and each of said left and right safety belts emanating from said respective first and second retractor spools in a generally horizontal direction; and a diverter plate extending integrally from said mounting plate for redirecting each of said left and right safety belts from said generally horizontal direction to said generally vertical use direction, said diverter plate including a left routing bar operatively associated with said left safety belt and a right routing bar operatively associated with said right safety belt.

2. An assembly as set forth in claim 1 further including a frame bracket fixedly extending from said mounting plate.

3. An assembly as set forth in claim 2 wherein said left and right routing bars comprise respective formed and rolled-over portions of said diverter plate.

4. An assembly as set forth in claim 3 wherein each of said left and right routing bars include an upper anti-slip hook.

5. An assembly as set forth in claim 4 wherein each of said left and right routing bars include a lower anti-slip hook.

6. An assembly as set forth in claim 2 further including a crotch buckle extending from said bottom cushion for coupling with each of said left and right safety belts.

7. An assembly as set forth in claim 6 wherein said left and right safety belts and said crotch buckle comprise a five-point safety harness.

8. A vehicular seating assembly including an integral child restraint seat, said assembly comprising: a seat portion; a backrest portion hingedly connected to said seat portion, said backrest portion including an internal frame structure; a rear cushion integrally recessed within said backrest portion; a bottom cushion pivotally extending from said rear cushion and moveable between a stowed position and a deployed position; left and right safety belts each for extending an effective length in a generally vertical use direction over the torso of a child; retractor means for adjusting the effective length of said left and right safety belts, said retractor means including a first retractor spool rotatably supported about a first axis of rotation; and a mounting plate for rotatably supporting said first retractor spool with said first axis of rotation oriented vertically and said left and right safety belts emanating from said retractor means in a generally horizontal direction; a diverter plate for redirecting said left and right safety belts from said generally horizontal direction upon emanating from said first retractor spool to said generally vertical use direction; said diverter plate including a left routing bar operatively associated with said left safety belt and a right routing bar operatively associated with said right safety belt; and a frame bracket extending from said mounting plate and fixedly connected to said internal frame structure of said backrest portion.

9. An assembly as set forth in claim 8 wherein said retractor means includes a second retractor spool rotatably supported about a second axis of rotation adjacent and parallel to said first axis.

10. An assembly as set forth in claim 9 wherein said diverter plate extends integrally from said mounting plate.

11. An assembly as set forth in claim 9 wherein said left and right routing bars, comprise respective formed and rolled-over portions of said diverter plate.

12. An assembly as set forth in claim 9 wherein said internal frame structure includes a left pass-over bar operatively associated with said left safety belt and a right pass-over bar operatively associated with said right safety belt.

13. An assembly as set forth in claim 12 wherein each of said left and right routing bars, include an upper anti-slip hook.

14. An assembly as set forth in claim 13 wherein each of said left and right routing bars, include a lower anti-slip hook.

15. An assembly as set forth in claim 9 further including a crotch buckle extending from said bottom cushion for coupling with each of said left and right safety belts.

16. An assembly as set forth in claim 15 wherein said left and right safety belts and said crotch buckle comprise a five-point safety harness.

* * * * *